US009646459B2

(12) United States Patent
Hsu

(10) Patent No.: US 9,646,459 B2
(45) **Date of Patent: *May 9, 2017**

(54) INCENTIVE APPARATUS FOR GAMBLING GAME SYSTEMS

(71) Applicant: Tien-Shu Hsu, Taichung (TW)

(72) Inventor: Tien-Shu Hsu, Taichung (TW)

( * ) Notice: Subject to any disclaimer, the term of this patent is extended or adjusted under 35 U.S.C. 154(b) by 705 days.

This patent is subject to a terminal disclaimer.

(21) Appl. No.: 13/952,222

(22) Filed: Jul. 26, 2013

(65) Prior Publication Data

US 2013/0316799 A1 Nov. 28, 2013

Related U.S. Application Data

(63) Continuation-in-part of application No. 12/794,350, filed on Jun. 4, 2010, now abandoned.

(30) Foreign Application Priority Data

Jan. 22, 2010 (TW) ............................ 099101700 A

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ...... *G07F 17/3244* (2013.01); *G07F 17/3258* (2013.01)

(58) Field of Classification Search

CPC .................................. A63F 9/04; G07F 17/32

See application file for complete search history.

(56) References Cited

U.S. PATENT DOCUMENTS

| | | | | |
|---|---|---|---|---|
| 2001/0008845 | A1* | 7/2001 | Kusuda | G07F 17/3244 463/25 |
| 2002/0068633 | A1* | 6/2002 | Schlaifer | G06Q 50/34 463/43 |
| 2004/0204216 | A1* | 10/2004 | Schugar | G07F 17/32 463/16 |
| 2006/0055112 | A1 | 3/2006 | Lean et al. | |
| 2006/0244218 | A1 | 11/2006 | Frankel et al. | |

(Continued)

*Primary Examiner* — Milap Shah

*Assistant Examiner* — Jason Pinheiro

(74) *Attorney, Agent, or Firm* — Muncy, Geissler, Olds & Lowe, P.C.

(57) ABSTRACT

An incentive apparatus for a gambling game system aims to increase the odds thereof. The gambling game system includes a betting table and a plurality of game results. The betting table has payout odds marked thereon corresponding to different game results of the gambling game system. The incentive apparatus includes a dynamic raised odds calculation element, an electronic display board and a payout element. The dynamic raised odds calculation element randomly selects a specific number of the game results and generates dynamic raised odds for the selected game results respectively. The electronic display board has a plurality of display zones corresponding to the game results. The display zones immediately display the dynamic raised odds after betting of each round of game stops. The payout element pays out to players who win the round of the game according to the payout odds or the dynamic raised odds.

15 Claims, 9 Drawing Sheets

(56) References Cited

U.S. PATENT DOCUMENTS

| | | | | |
|---|---|---|---|---|
| 2007/0057466 | A1* | 3/2007 | Soltys | G07F 17/322 273/292 |
| 2009/0176547 | A1* | 7/2009 | Katz | G07F 17/32 463/13 |
| 2009/0176548 | A1* | 7/2009 | Nakamura | G07F 17/32 463/17 |
| 2010/0062851 | A1* | 3/2010 | Kido | G07F 17/32 463/31 |

* cited by examiner

| Dynamic raised odds | | | | |
|---|---|---|---|---|
| Banker wins | Tie | Player wins | Banker pair | Player pair |
| 1:1 | 1:10 | 1:1 | 1:14 | 1:11 |

50
51
511

Fig. 4

INCENTIVE APPARATUS FOR GAMBLING GAME SYSTEMS

This application is a continuation-in-part, and claims priority, of from U.S. patent application Ser. No. 12/794,350 filed on Jun. 4, 2010, entitled "AN INCENTIVE METHOD FOR A GAMBLING GAME", the entire contents of which are hereby incorporated by reference.

FIELD OF THE INVENTION

The present invention relates to a gambling game system and particularly to an apparatus to increase appeal of a gambling game system.

BACKGROUND OF THE INVENTION

A gambling game system mainly provides a betting table for players to place bets on different game results. The betting table shows different odds corresponding to different game results based on their appearing probability. In the event that the game result matches the player's bet, the player receives a payout according to the odds and betting amount.

The common gambling game systems nowadays are Baccarat, Dice game, Roulette and the like. They have official odds according to different game results. Take Baccarat for instance, the appearing probability of banker pair or player pair is 7.47%, and the odds generally is 1 wins 11, and the converted player's return ratio is about 89.6%. The player's return ratio means the average return ratio of a fixed amount betted by a player. Take the example that the return ratio is 89.6%, in average the player can receive $896 in return for a betting amount of $1000.

Due to the player's return ratio of the game results of most gambling game systems is relatively low and fixed, players often feel frustrated of losing money fast and discouraged by the unfairness of the games. The fixed odds also make players feel bored easily and reduce the appeal for the players after a short duration. Once the fresh and exciting feel fades, utilization of the gambling game system drops gradually. As a result, the benefit of the gambling game system cannot be fully realized. To attract and motivate the players, the theme and playing scheme of the game have to be innovated and changed constantly to maintain the fresh feeling of the players. But this makes business cost higher.

SUMMARY OF THE INVENTION

The primary object of the present invention is to provide an apparatus that can dynamically raise the odds of a gambling game system.

To achieve the foregoing object, the present invention provides an incentive apparatus for a gambling game system. The gambling game system includes a betting table and a plurality of game results. The betting table has payout odds marked thereon corresponding to different game results of the gambling game system. The incentive apparatus includes a dynamic raised odds calculation element, an electronic display board and a payout element. The dynamic raised odds calculation element randomly selects a specific number of the game results and generates dynamic raised odds for the selected game results respectively. The electronic display board has a plurality of display zones corresponding to the game results. The display zones instantly display the dynamic raised odds after betting of each round of game stops. The payout element pays out to the players who win the round of the game according to the payout odds or the dynamic raised odds which is at a higher priority.

Thus, through the incentive apparatus of the invention, the payout element pays out to the players who win the round of the game according to the payout odds or the dynamic raised odds which is at a higher priority. In the event that the player wins the betting round of the game, he/she may get payout according to the dynamic raised odds and get an extra incentive. According to the invention, the dynamic raised odds can be generated at each round of the game by selecting a specific number of the game results, hence there is sufficient amount of dynamic raised odds to attract players' attention to place bets. Therefore, utilization of the gambling game system can be increased to achieve maximum business benefit.

The foregoing, as well as additional objects, features and advantages of the invention will be more readily apparent from the following detailed description, which proceeds with reference to the accompanying embodiments and drawings. The embodiments merely serve for illustrative purpose and are not the limitation of the invention.

BRIEF DESCRIPTION OF THE DRAWINGS

FIG. 4 is a picture of an electronic display board of the invention.

DETAILED DESCRIPTION OF THE PREFERRED EMBODIMENTS

Figure 1:
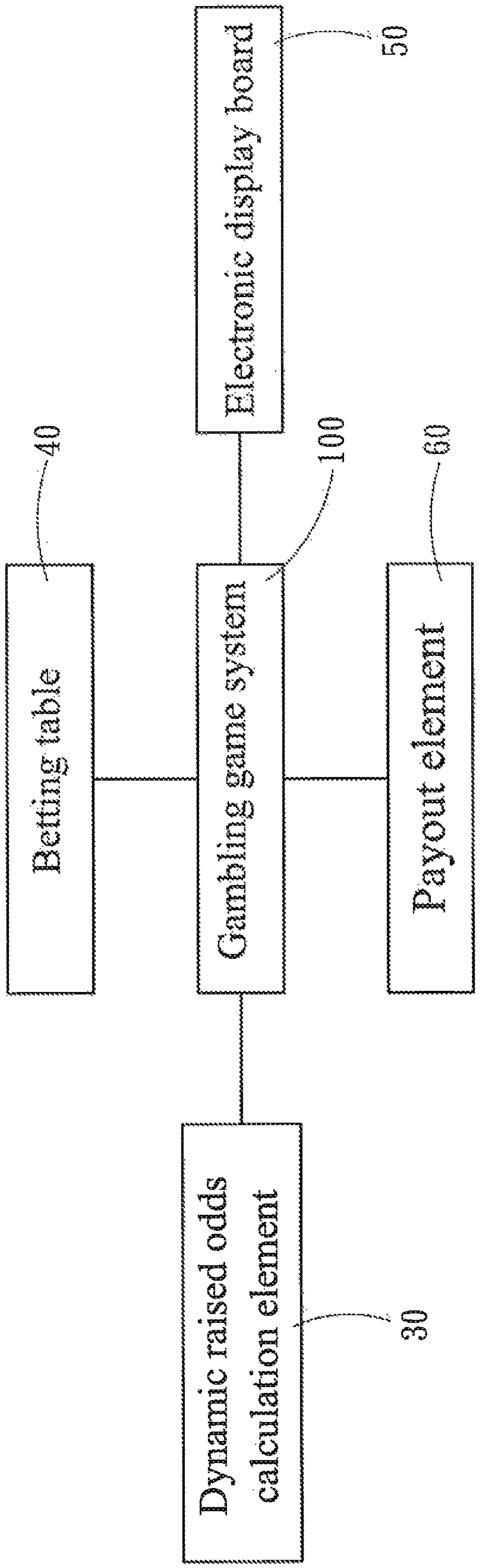
FIG. 1 is a block diagram of the gambling game system of the invention.

Please refer to FIGS. 1 through 4 for a first embodiment of the invention. The gambling game system 100 is Baccarat as an example for discussion. It provides a Baccarat game for a banker 10 and a player (not shown in the drawings). The Baccarat game has five game results, i.e., banker wins, tie, player wins, banker pair and player pair. It is to be noted that the banker pair or player pair is the game result that the banker 10 or player gets the same first two cards, and the banker pair and player pair can appear with any of the banker wins, tie and player wins at the same time. The banker pair or player pair in the game result is judged independently, and does not affect banker wins, tie or player wins.

In this embodiment, the gambling game system 100 includes a pack of poker cards 20, a dynamic raised odds calculation element 30, a betting table 40, an electronic display board 50 and a payout element 60. The poker cards 20 are provided to play the Baccarat game and generate at least one (anyone of banker wins, tie and player wins, plus banker pair and player pair) of the five game results.

Figure 2:
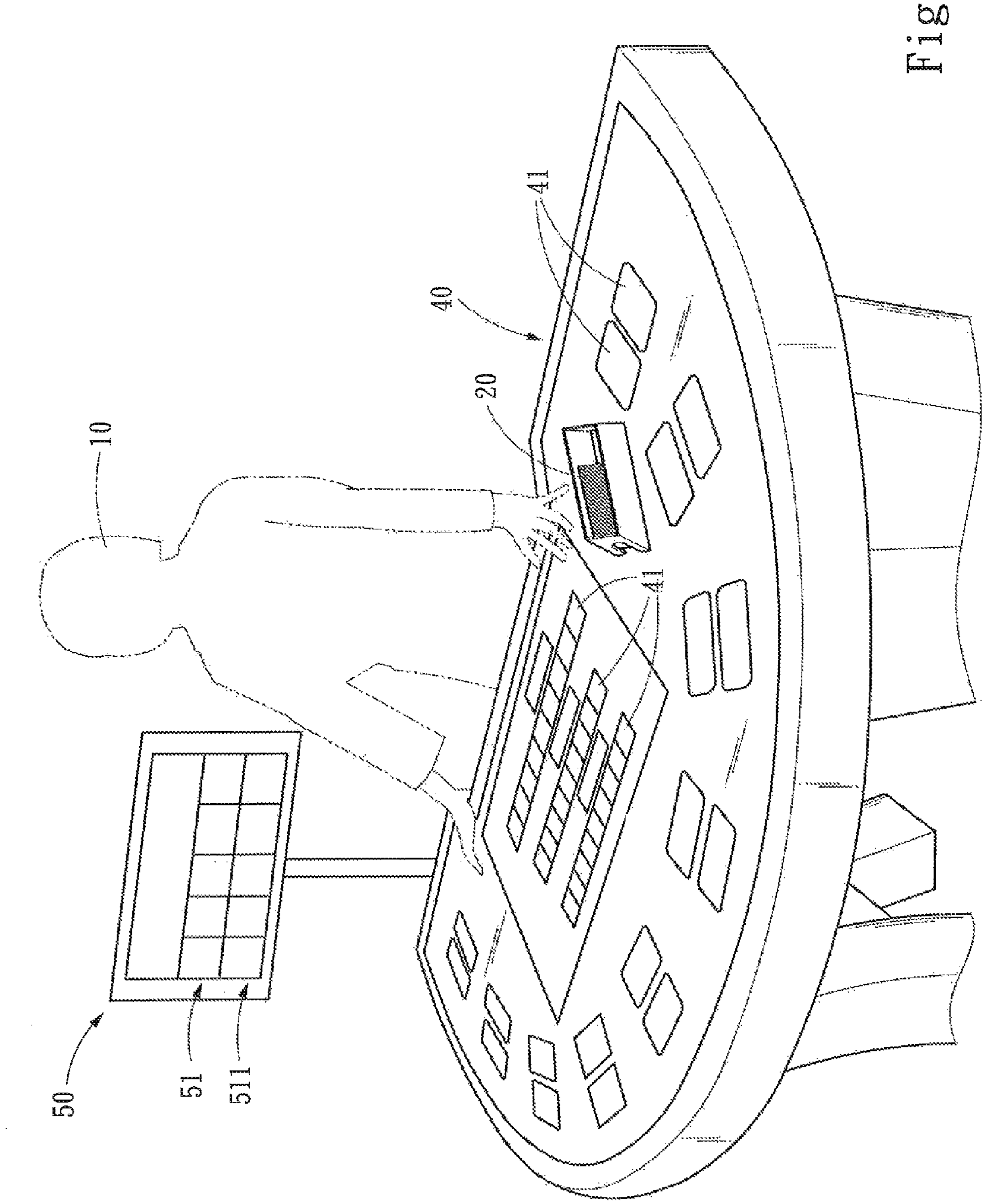
FIG. 2 is a schematic view a physical table setup of a first embodiment of the invention.
Figure 3:
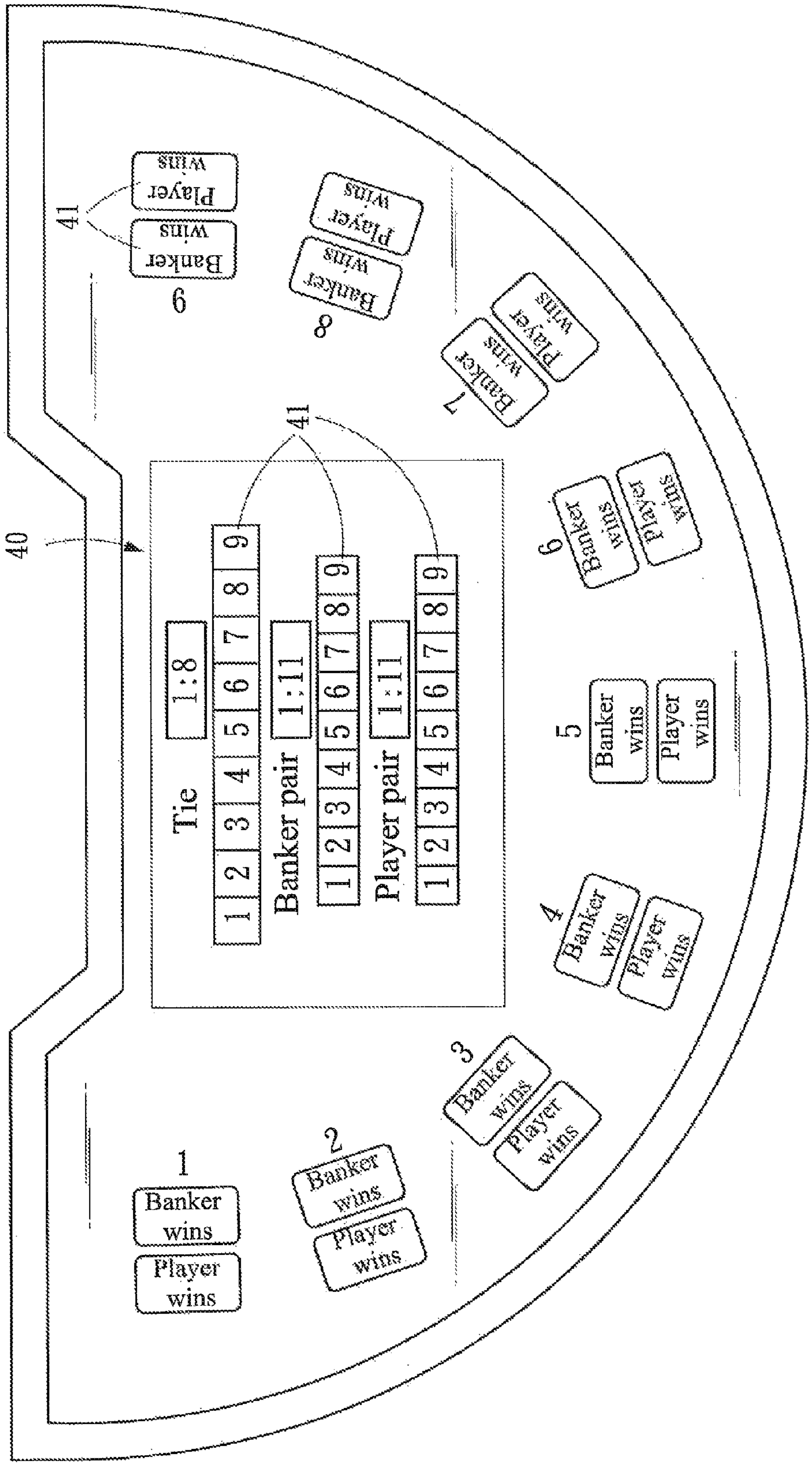
FIG. 3 is a schematic view of the betting table of the first embodiment of the invention.

The betting table 40 has five betting zones 41 to indicate the five game results, and is divided into nine segments (numbered 1-9) to allow nine players to place bets at the same time. The five betting zones 41 are drawn and marked on the table surface. In the event that the betting table 40 is a physical table, the electronic display board 50 can serve as a viewing board located at one side near the betting table 40 (as shown in FIG. 2). Each of the five betting zones 41 is for the players to place bets and has corresponding payout odds. The electronic display board 50 includes at least on display zone 51 corresponding to the betting zone 41, and the display zone 51 displays dynamic raised odds 511.

Moreover, the dynamic raised odds calculation element 30 selects randomly a specific number of the five game results and generates the dynamic raised odds 511 for the selected game results respectively. Take Baccarat for instance, one of the five game results can be randomly selected, and the electronic display board 50 has a plurality of display zones 51 corresponding to the five game results. After betting is stopped at each round of game, the display zones 51 immediately display the corresponding dynamic raised odds 511, and the payout element 60 pays out to the players who win the round of the game according to the payout odds or the dynamic raised odds 511 which is at a higher priority.

For instance, in the event that the dynamic raised odds calculation element 30 randomly selects "banker pair" from the five game results to generate the dynamic raised odds 511, and the payout odds for the "banker pair" is 1 wins 11 (the present commonly accepted conventional odds), and the amount of raised odds selected for the dynamic raised odds 511 can be four, wherein the raised odds are respectively 1 wins 12, 1 wins 13, 1 wins 14 and 1 wins 15 with corresponding appearing probability of 80%, 17%, 2% and 1%. Or, in order to give the players the excitement of hitting a jackpot, the raised odds can be changed to 1 wins 12, 1 wins 14, 1 wins 20 and 1 wins 30 with corresponding appearing probability changed to 90%, 8%, 1.5% and 0.5%, so that the player's return ratio is controlled below 100%.

The other game results, i.e., tie, banker wins, player wins and player pair also can adopt the scheme of generating the dynamic raised odds 511 previously discussed with different raised odds, and the appearing probability of different raised odds can be determined through mathematical calculation according to actual requirements or announced regulations, details are omitted herein.

Figure 5:
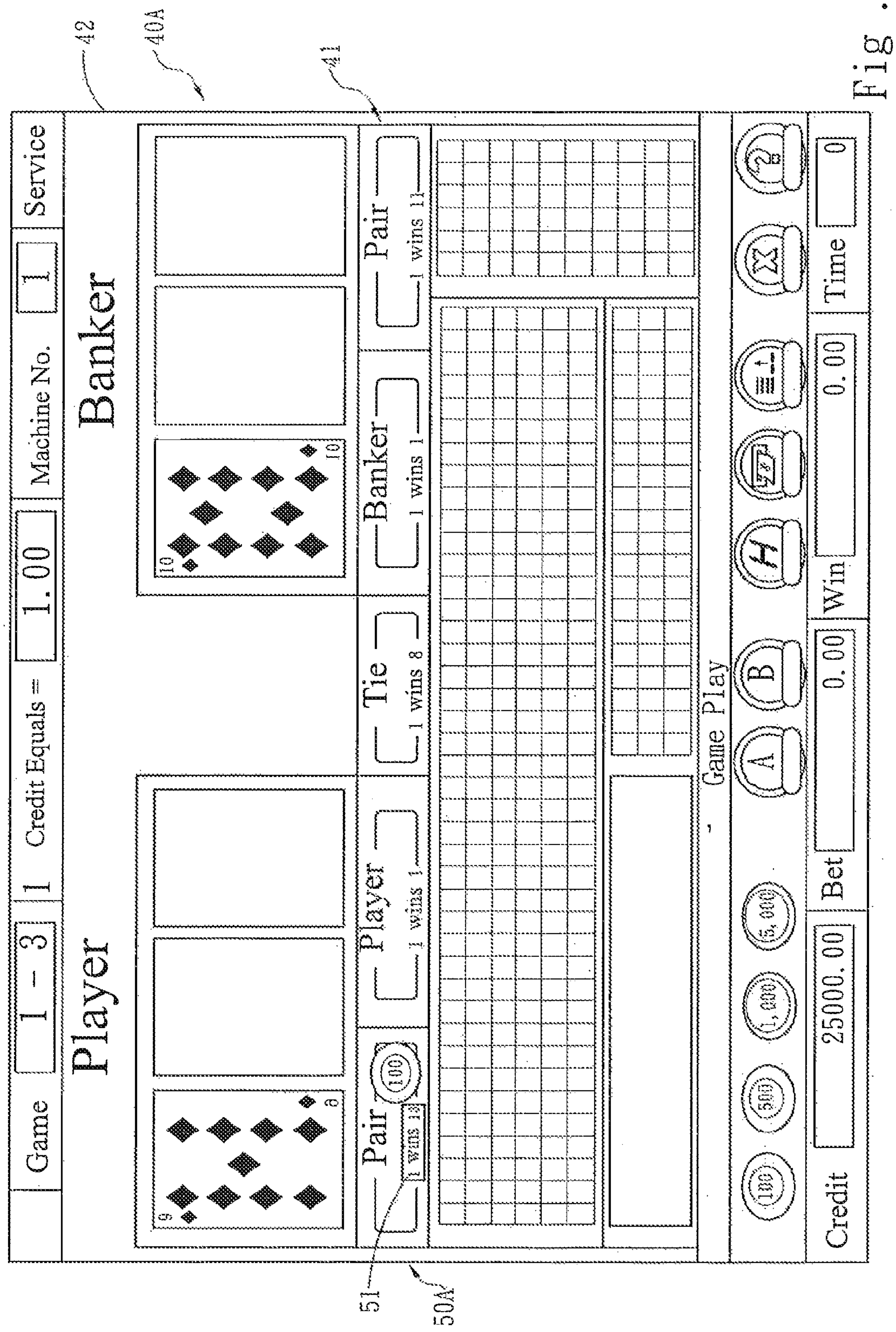
FIG. 5 is a schematic view of an electronic interface of a betting table of the first embodiment of the invention.

Also referring to FIG. 5, the betting table 40A can also be an electronic betting interface with an electronic screen 42. The five betting zones 41 of the betting table 40A are displayed on the electronic screen 42 which can be a touch screen. The electronic display board 50A can be integrated in the electronic betting table 40A and displayed on the electronic screen 42. The number of the display zones 51 of the electronic display board 50A corresponds to that of the betting zones 41 on the betting table 40A, and the display zones 51 are abutting to the betting zones 41 to display the payout odds electronically. After the dynamic raised odds 511 are generated, they replace the payout odds. The display zones 51 can display the dynamic raised odds by color change, luminosity increase or profile highlight.

Figure 6:
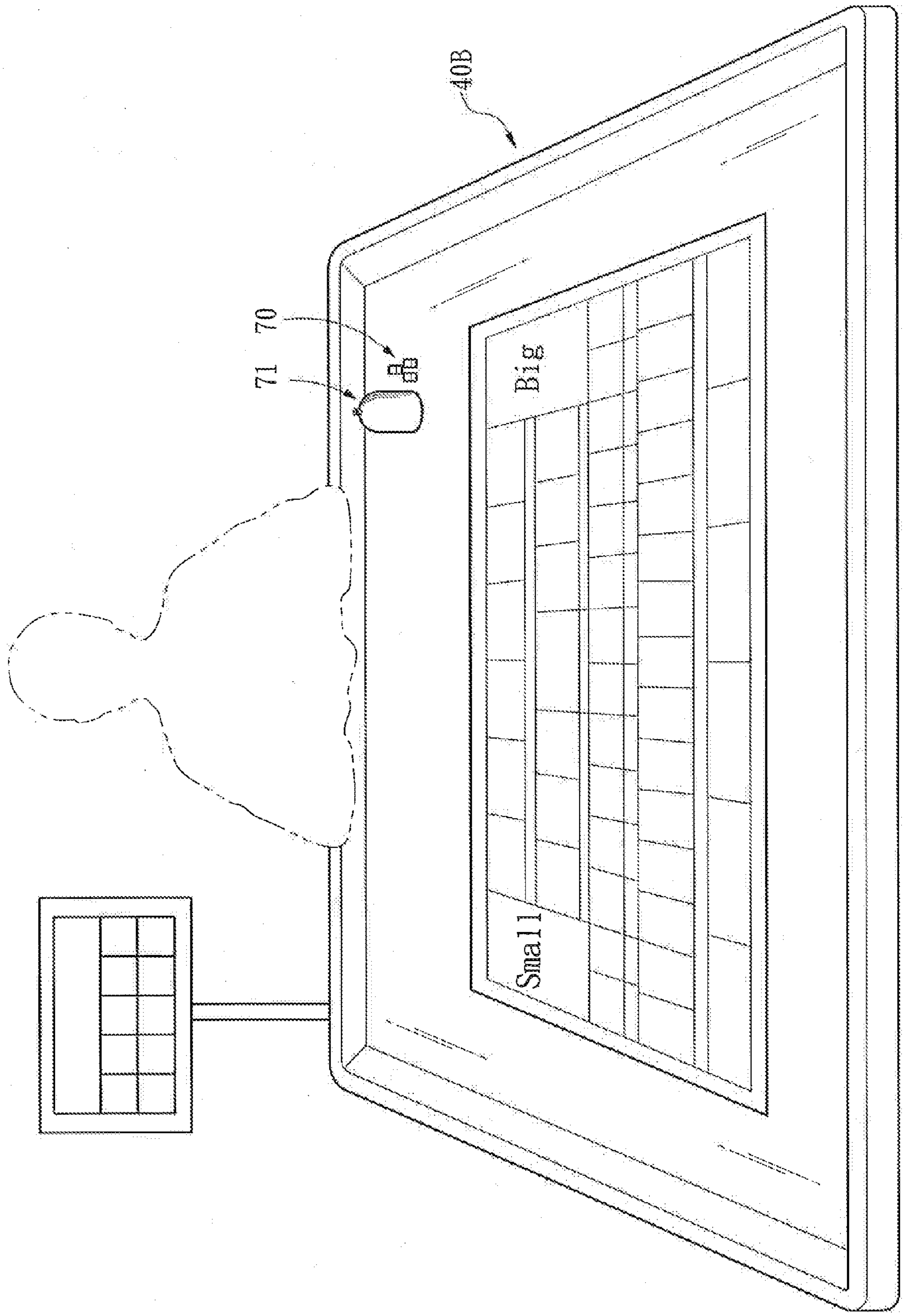
FIG. 6 is a schematic view of a physical table setup of a second embodiment of the invention.
Figure 7:
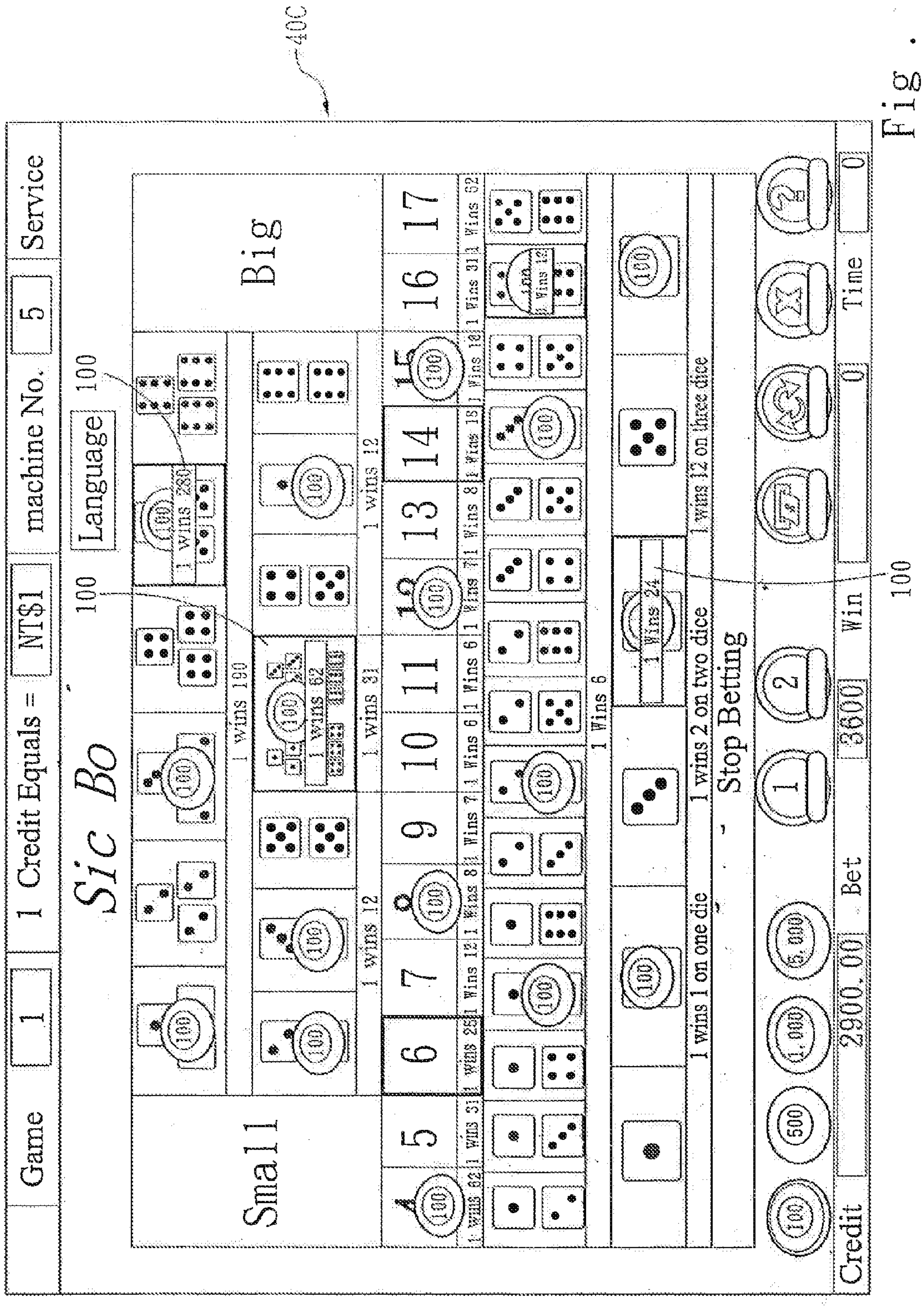
FIG. 7 is a schematic view of an electronic interface of a betting table of the second embodiment of the invention.

Please refer to FIGS. 6 and 7, the gambling game system 100, asides from Baccarat, can also be a dice game with three dices 70 and a dice cup 71. The betting table 40B also can be a physical table (as shown in FIG. 6). Or the betting table 40C can be an electronic interface (as shown in FIG. 7).

Figure 8:
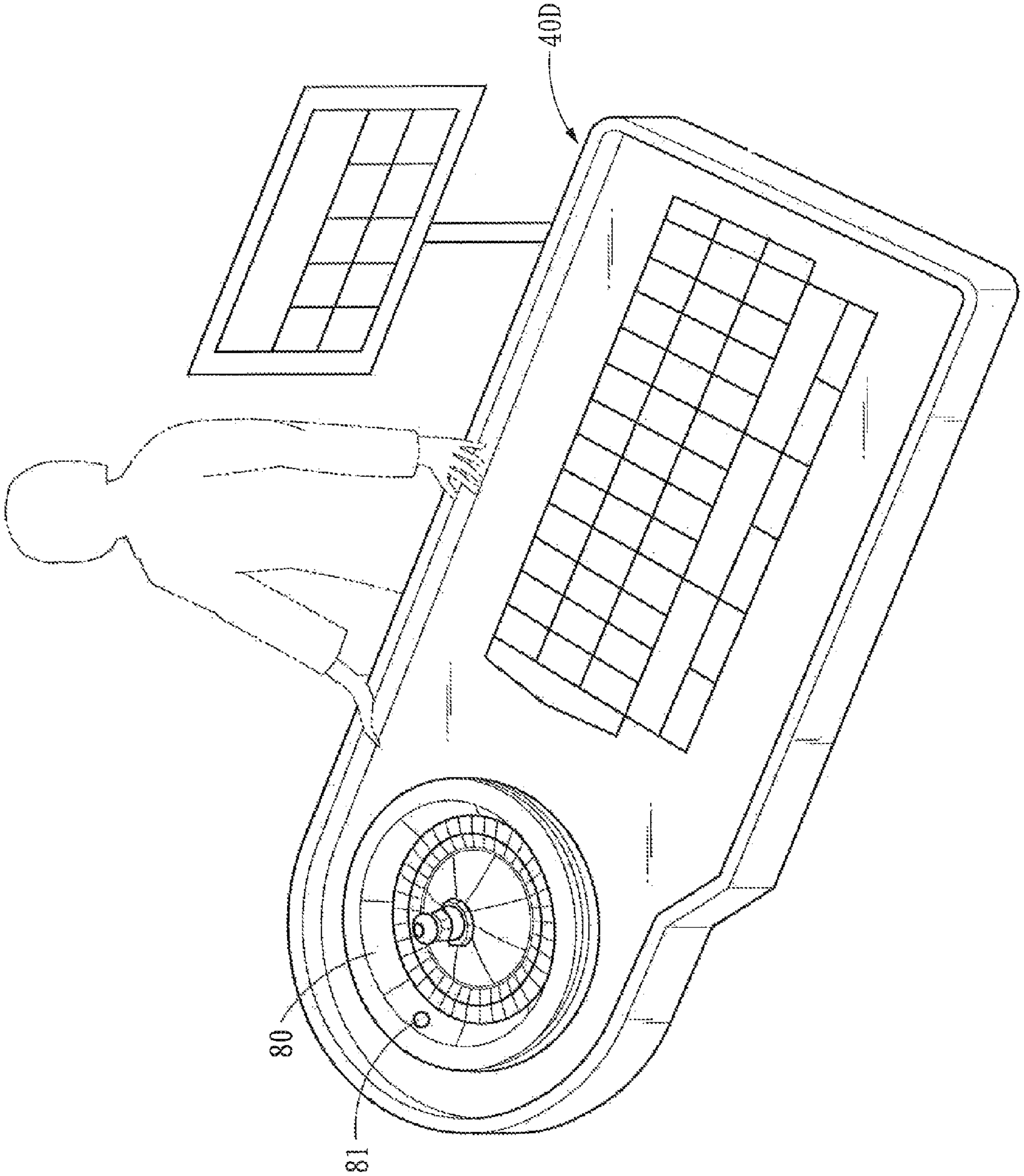
FIG. 8 is a schematic view a physical table setup of a third embodiment of the invention.
Figure 9:
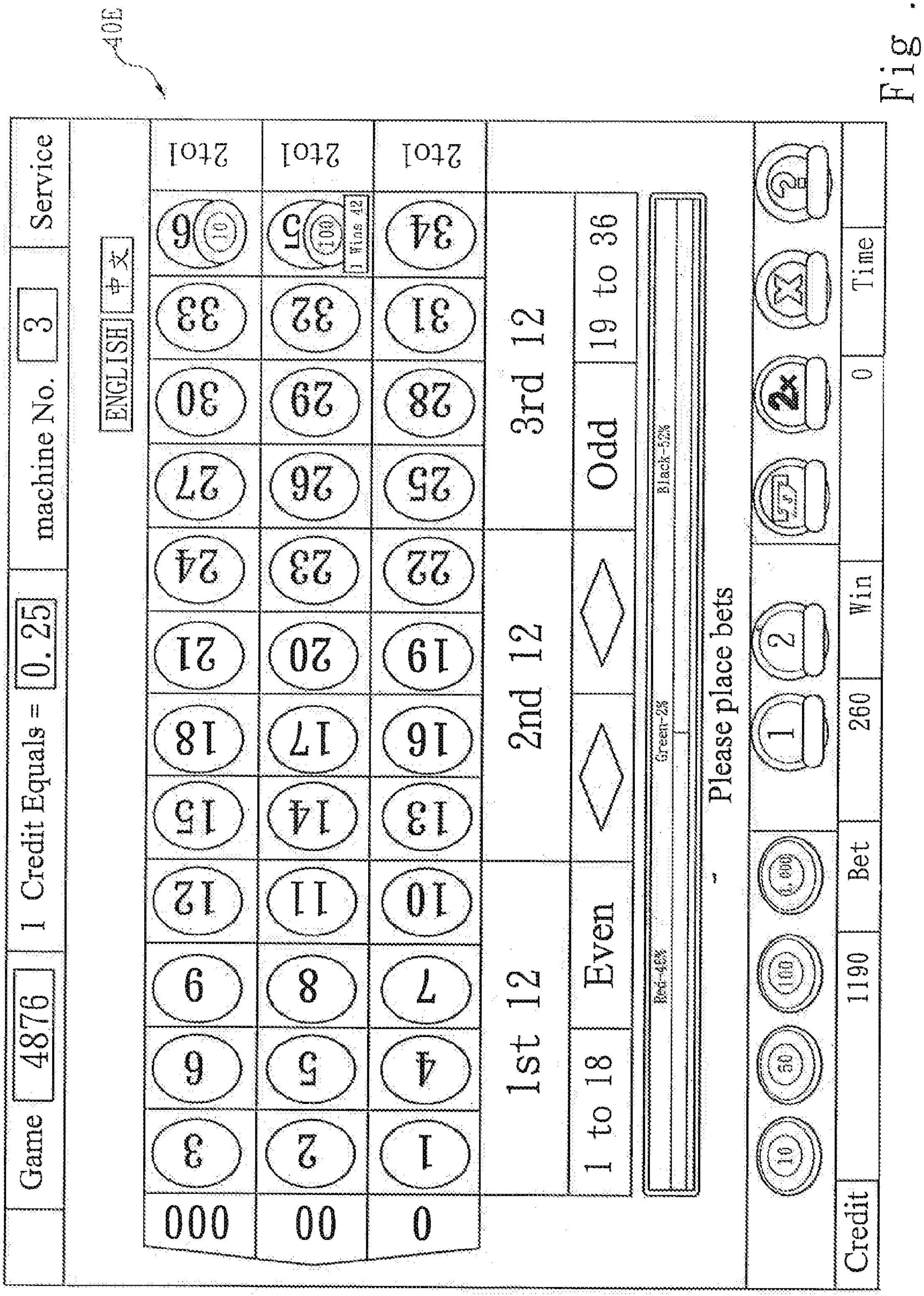
FIG. 9 is a schematic view of an electronic interface of a betting table of the third embodiment of the invention.

Referring to FIGS. 8 and 9, the gambling game system 100 also can be Roulette with a roulette wheel 80 and a colored ball 81. The betting table 40D also can be a physical table (as shown in FIG. 8). Or the betting table 40E can be an electronic interface (as shown in FIG. 9).

As a conclusion, the incentive apparatus of the invention allows the payout element to pay out to the players who win the round of game according to the payout odds or the dynamic raised odds which is at a higher priority. Hence the player who wins the round of game can get extra payment according to the dynamic raised odds and obtain extra incentive. Therefore, the appeal of gambling game system is greater. Moreover, at each round of the game, a specific number of the game results is selected to generate the dynamic raised odds to attract players' attention to place bets. As a result, utilization of the gambling game system increases and maximum business benefit can be achieved.

What is claimed is:

1. An incentive apparatus for a gambling game system comprising:

a betting table, including a plurality of betting zones, wherein each of the plurality of betting zones in the gambling game system includes a game results respectively, each of the game results is different and includes a payout odds respectively;

a calculation element, including a dynamic raised odds choosing module and a payout module, in which the dynamic raised odds choosing module is connected to the betting table to retrieve each of the plurality of game results and replaces the original payout odds of one of the plurality of game results, which is randomly selected, with a dynamic raised odds, and the payout module pays out odds, according to the selected one of the game results, after the gambling game system is over; and an electronic display board connecting to the calculation element and including a plurality of display zones, each of the display zone displaying one of the plurality of game results respectively, wherein the electronic display board displays the dynamic raised odds of at least one of the plurality of game results in the display zones.

2. The incentive apparatus for the gambling game system of claim 1, wherein the gambling game system is a dice game including three dices and a dice cup.

3. The incentive apparatus for the gambling game system of claim 1, wherein the gambling game system is a roulette game including a roulette wheel and a colored ball.

4. The incentive apparatus for the gambling game system of claim 1, wherein the gambling game system is Baccarat including a pack of poker cards and the game results include banker wins, tie, player wins, banker pair and player pair.

5. The incentive apparatus for the gambling game system of claim 1, wherein the electronic display board is located next to the betting table.

6. The incentive apparatus for the gambling game system of claim 1, wherein the betting table includes an electronic screen, and the plurality of betting zones displayed on the electronic screen.

7. The incentive apparatus for the gambling game system of claim 6, wherein the electronic screen is a touch screen.

8. An incentive apparatus for a gambling game system comprising:

a betting table, including a plurality of betting zones and an electronic screen, wherein each of the plurality of betting zones in the gambling game system includes a game results respectively, each of the game results is different and includes a payout odd respectively;

a calculation element, including a dynamic raised odds choosing module and a payout module, in which the dynamic raised odds choosing module is connected to the betting table to retrieve each of the plurality of game results and replaces the original payout odds of one of the plurality of game results, which is randomly selected, with a dynamic raised odds, and the payout module pays out odds, according to the selected one of game results, after the gambling game system is over; and an electronic display board connecting to the calculation element and including a plurality of display zones, each of the display zone displaying one of the plurality of game results respectively, wherein the electronic display board displays the dynamic raised odds and wherein the electronic display board is integrated in the electronic screen.

9. The incentive apparatus for the gambling game system of claim 8, wherein the gambling game system is a dice game including three dices and a dice cup.

10. The incentive apparatus for the gambling game system of claim 8, wherein the gambling game system is a roulette game including a roulette wheel and a colored ball.

11. The incentive apparatus for a gambling game system of claim 8, wherein the gambling game system is Baccarat including a pack of poker cards and the game results include banker wins, tie, player wins, banker pair and player pair.

12. The incentive apparatus for the gambling game system of claim 8, wherein the plurality of betting zones displayed on the electronic screen.

13. The incentive apparatus for the gambling game system of claim 12, wherein the electronic screen is a touch screen.

14. The incentive apparatus for the gambling game system of claim 12, wherein the number of the display zones of the electronic display board is corresponding to that of the betting zones of the betting table, the display zones abutting the betting zones to display electronically the payout odds, the payout odds being replaced by the generated dynamic raised odds.

15. The incentive apparatus for the gambling game system of claim 14, wherein the display zones display the dynamic raised odds by color change, luminosity increase or profile highlight.

* * * * *